United States Patent [19]

Kurio et al.

[11] Patent Number: 4,973,233

[45] Date of Patent: Nov. 27, 1990

[54] FOUR-ROTOR TYPE ROTARY PISTON ENGINE

[75] Inventors: Noriyuki Kurio, Aki; Junichi Funamoto, Hiroshima; Isao Shimizu, Higashihiroshima; Yoshitaka Matsumuro, Kure, all of Japan

[73] Assignee: Mazda Motor Corporation, Hiroshima, Japan

[21] Appl. No.: 494,855

[22] Filed: Mar. 14, 1990

Related U.S. Application Data

[63] Continuation of Ser. No. 242,342, Sep. 9, 1988, abandoned.

[30] Foreign Application Priority Data

Sep. 11, 1987 [JP] Japan ................................ 62-227590
Oct. 14, 1987 [JP] Japan ................................ 62-259316

[51] Int. Cl.⁵ .......................... F01C 11/00; F16C 3/12; B23P 11/00

[52] U.S. Cl. .......................................... 418/60; 74/570; 29/888.012; 29/888.08

[58] Field of Search ................. 418/60, 61.2; 123/242; 74/567, 570, 597; 29/888.012, 888.08, 888.1

[56] References Cited

U.S. PATENT DOCUMENTS 3,240,423 3/1966 Jones ..................................... 418/60
3,279,279 10/1966 Takebayashi ......................... 418/60
3,352,290 11/1967 Kuroda ................................. 418/60
4,729,726 3/1988 Kurio et al. ........................... 418/60

FOREIGN PATENT DOCUMENTS 45-8482 4/1970 Japan .
60-69204 4/1985 Japan .
60-69205 4/1985 Japan .
60-69207 4/1985 Japan .
60-69208 4/1985 Japan .
60-69209 4/1985 Japan .

*Primary Examiner*—John J. Vrablik
*Attorney, Agent, or Firm*—Fleit, Jacobson, Cohn, Price, Holman & Stern

[57] ABSTRACT

A four-rotor type rotary piston engine including an eccentric shaft assembly composed of three elements; a main eccentric shaft defining the rotational axis of each rotor and first and second auxiliary eccentric shafts coupled to opposite end of the main eccentric shaft. The auxiliary eccentric shafts and the main eccentric shaft art fitted by tapered surfaces and have a small clearance therebetween in the radial direction to enable smooth coupling. The main eccentric shaft has two rotor eccentric journals for the second and the third cylinders. At first, the second and the third cylinders are installed. After that, the auxiliary eccentric shafts having rotor eccentric journals are coupled with the main eccentric shaft, and finally the first and the fourth cylinders are installed.

8 Claims, 6 Drawing Sheets

FIG. I

FOUR-ROTOR TYPE ROTARY PISTON ENGINE

This application is a continuation of application Ser. No. 07/242,342, filed Sept. 9, 1988 abandoned.

FIELD OF THE INVENTION

The present invention relates to four-rotor type rotary piston engines, and more particularly to eccentric shaft structures for four-rotor type rotary piston engines and an installation method.

BACKGROUND OF THE INVENTION

As well known in rotary piston engines, an eccentric shaft with rotor journal portions having axes offset to the axis of the eccentric shaft is disposed longitudinally extended in the center of the rotary piston for mounting eccentrically rotating rotors. Each rotor defines three cavities in the working chamber formed by the rotor housing having an inner wall of trochoidal configuration and a pair of side housings attached to the end surface of the rotor housing abutting the working chamber.

In the multiple-rotor type rotary piston engine having an eccentric shaft with rotor journal portions corresponding to each rotor, if the journals of the eccentric shaft are provided between the rotor journal portions, the installation of the eccentric shaft into the engine housing is difficult. Generally speaking, this difficulty relates to the geometrical relation between larger rotor journal portions and smaller eccentric journal portions. In case that the eccentric journal portion is as large as the rotor journal portion, though the installation may be facilitated, other serious problems, such as, escape of compressed gas through the eccentric journal portion are encountered. Therefore, the eccentric journal portions are formed smaller than the rotor journal portions.

In order to resolve the problem, an eccentric shaft assembly composed of divided eccentric shafts each of which corresponds to one of the rotors has been proposed in the prior art, for example, in Japanese Utility Model (Jikkosho) 45-8482. As proposed, the eccentric shaft assembly is made for the four-rotor type piston engine. These divided eccentric shafts are connected in meshing engagement with each other, and are integrated by one through bolt. Such an eccentric shaft assembly, however, has a weak point in tightness of connection because the bolt may be loosen by heat deformations or stress deformations. If the bolt loosens, then unallowable vibration of the engine will be experienced. Also it is difficult to connect four divided eccentric shafts precisely on the same common axis in view of production tolerances and errors.

On the other hand, Japanese Laid-open Patent Application No. (Tokkaisho) 60-69208 shows another eccentric shaft structure having no through bolt. The eccentric shaft assembly of this publication is designed especially for a three-rotor type piston engine, and therefore, is not capable for use in a four-rotor type piston engine. Even if one were attempt to add another rotor eccentric portion by way of an auxiliary eccentric shaft joined with a main eccentric shaft so that the auxiliary eccentric shaft and the main eccentric shaft have two rotor eccentric portions, respectively, the eccentric shaft assembly would have unallowable vibration and one would have difficulty in centering of the shafts.

SUMMARY OF THE INVENTION

It is, therefore, an object of the present invention to provide an eccentric shaft structure for a four-rotor type rotary piston engine that avoids the problems of the prior art and is easier and more efficiently made and installed.

Another object of the present invention is to provide an eccentric shaft structure capable of maintaining a proper rigidity.

A further object of the present invention is to provide an eccentric shaft structure having a suppressed and allowable vibration.

A still further object of the present invention is to provide an eccentric shaft structure which enables centering of shafts to be effected easily.

Yet a further object of the present invention is to provide an eccentric shaft structure that enables its installation to be facilitated.

According to the present invention, the above and other objects can be accomplished by providing a novel eccentric shaft structure for a four-rotor type rotary piston engine in accordance with the teachings of the present invention. The eccentric shaft assembly of the present invention is composed of three elements; a main eccentric shaft defining a rotational axis for each rotor, a first auxiliary eccentric shaft of cylindrical configuration inserted on one end of the main eccentric shaft and a second auxiliary eccentric shaft of cylindrical configuration inserted on the other end of the main eccentric shaft. The main eccentric shaft has an outer surface formed with an enlarged diameter portion in its center portion, one smaller diameter portion integrated through a tapered portion with one end of the larger diameter portion and another smaller diameter portion integrated through another tapered portion with the other end of the larger diameter portion.

The first auxiliary eccentric shaft has an inner surface tapered to be fitted to the tapered portion on one end of the larger diameter portion. The second auxiliary eccentric shaft has an inner surface tapered to be fitted to the other tapered portion on the other end of the larger diameter portion. The larger diameter portion of the main eccentric shaft has two rotor eccentric portions for a second rotor and a third rotor, respectively. The one smaller diameter portion with the first auxiliary eccentric shaft fitted thereon provides a rotor eccentric portion for a first rotor. The other smaller diameter portion with the second auxiliary eccentric shaft fitted thereon provides a rotor eccentric portion for a fourth rotor.

Therefore, by fastening the first and the second auxiliary eccentric shafts onto both ends of the main eccentric shaft in the axial direction, the first and the second auxiliary eccentric shafts are integrally assembled with the main eccentric shaft.

BRIEF DESCRIPTION OF THE DRAWINGS

The above and other objects and features of the present invention will become apparent from the following descriptions of a preferred embodiment taking reference to the accompanying drawings.

DESCRIPTION OF THE PREFERRED EMBODIMENT

1. Structure of the Embodiment

1.1. Housing Structure

Figure 1:
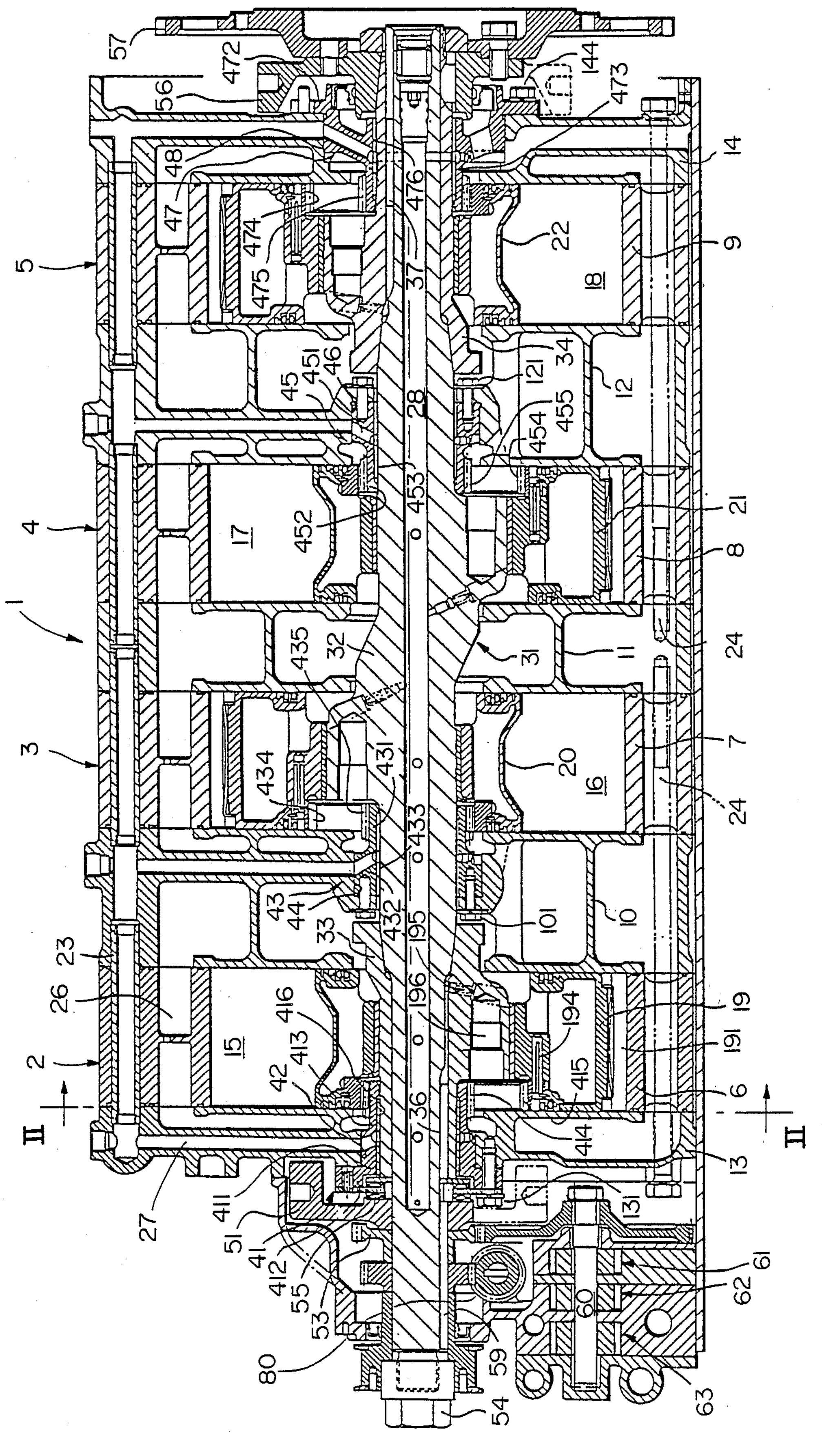
FIG. 1 is an axially sectional view of a four-rotor type rotary piston engine in accordance with one embodiment of the present invention.
Figure 2:
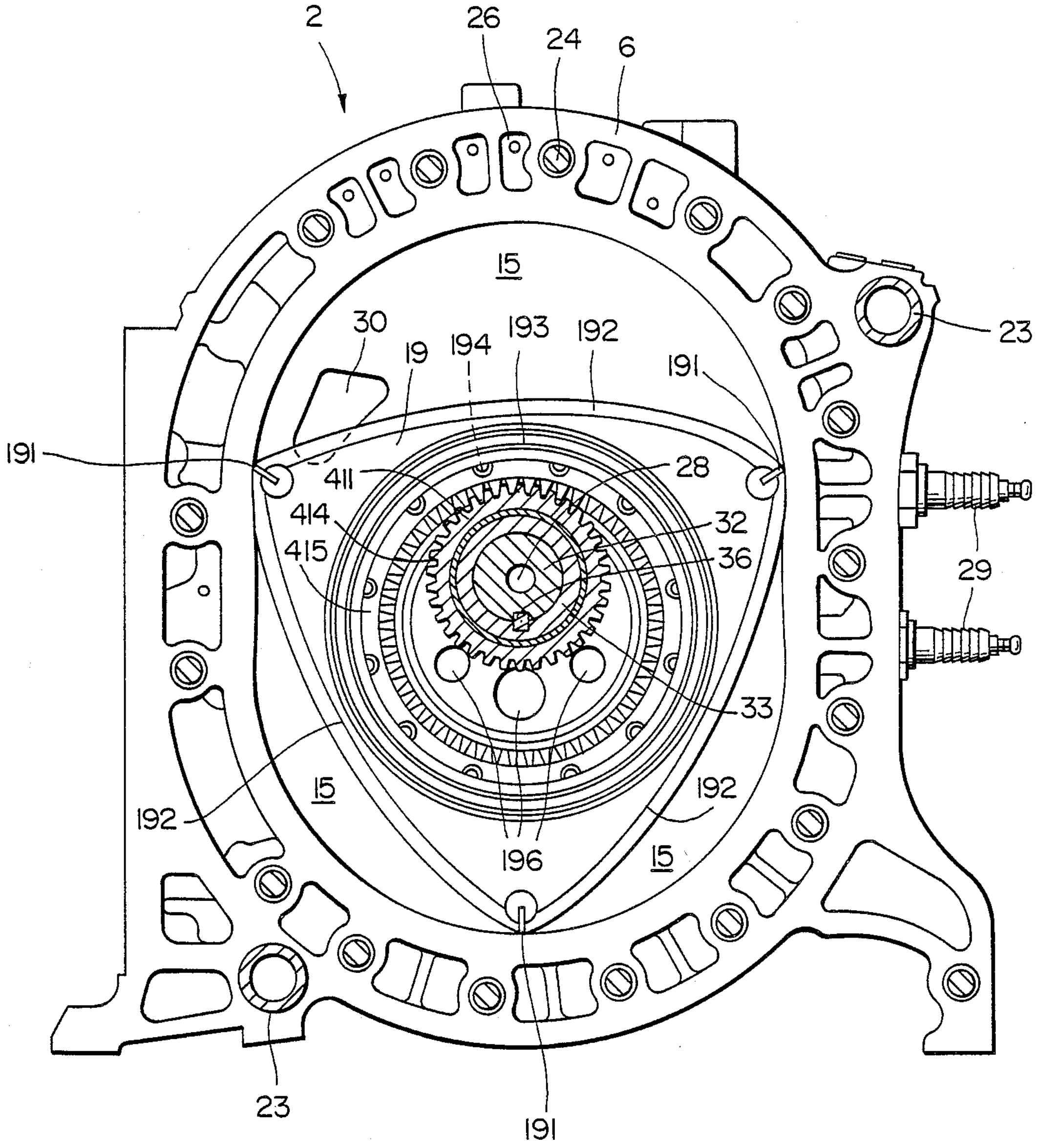
FIG. 2 is a cross-sectional view taken along line II—II FIG. 1.

Referring to FIG. 1, the engine has four cylinders; a first cylinder 2, a second cylinder 3, a third cylinder 4 and a fourth cylinder 5, numbered from left to right in FIG. 1. These cylinders 2, 3, 4 and 5 are defined by four rotor housings 6, 7, 8 and 9 each having an inner wall surface of trochoidal configuration, three intermediate housings 10, 11 and 12 disposed between the rotor housings 6, 7, 8 and 9 and attached to the side surfaces of the rotor housings 6, 7, 8 and 9, and side housings 13 and 14 attached on the left end surface of the rotor housing 6 and on the right end surface of the rotor housing 9, respectively. In the cylinder 2 (3, 4 and 5), there are defined three working chambers 15 (16, 17 and 18) divided by the rotor 19 (20, 21 and 22 of substantially triangular configuration, as shown in FIG. 2.

These housings 6–14 are connected, spaced and positioned by hollow pins 23, and are firmly connected by tightening bolts 24. In these housings 6–14, cooling water passages 26 are provided so as to surround the working chamber 15, 16, 17 and 18, and lubrication oil passage 27 is provided to be insolated from the cooling water passage 26. The hollow pins 23 are communicated with the lubrication oil passage 27 so that the through holes of the hollow pins 23 act as a part of the lubrication oil passage.

1.2. Rotor Supporting Structure

Rotors 19, 20, 21 and 22 are all of the same structure. Therefore, the following description explaining the first cylinder 2, as a representative example, will apply with equal effect for all cylinders and rotors. In FIG. 2, a main eccentric shaft 32 is disposed along the axis of cylinder 2 passing through substantially the center of the rotor housing 6. A first auxiliary eccentric shaft 33 is fitted to or coupled on the outer surface of the main eccentric shaft 32. The main eccentric shaft 32 and the first auxiliary eccentric shaft 33 are connected together by means of a key 36. A geared hub 411 is disposed around the periphery of the first auxiliary eccentric shaft 33. This geared hub 411 is, as illustrated hereafter in detail, fixed on the first side housing 13 and is provided with a stationary external gear 414. The first rotor 19 of substantially triangular configuration has an internal gear 415, which has a larger diameter than the external gear 414 and is fixed inside the center portion of the first rotor 19 by means of a plurality of spring pins 194. By virtue of the meshing engagement of the stationary external gear 414 and the internal gear 415, the first rotor 19 can rotate precisely along the trochoidal inner surface of the first rotor housing 6. The first rotor 19 has, also, apex seals 191 and side seals 192 for preventing the leakage of compressed gas between working chambers.

The main eccentric shaft 32 has a lubrication oil passage 28 of a through hole configuration. A part of the lubrication oil in the passage 28 is introduced inside the first rotor 19 through an oil jet 195 so as to cool the first rotor 19 (See FIG. 1). Number 193 denotes an oil ring, and number 196 denotes a balancing hole for reducing the weight of the first auxiliary eccentric shaft. Number 29 denotes an ignition plug, and number 30 denotes an intake air port.

1.3 ECCENTRIC SHAFT ASSEMBLY STRUCTURE

Figure 3:
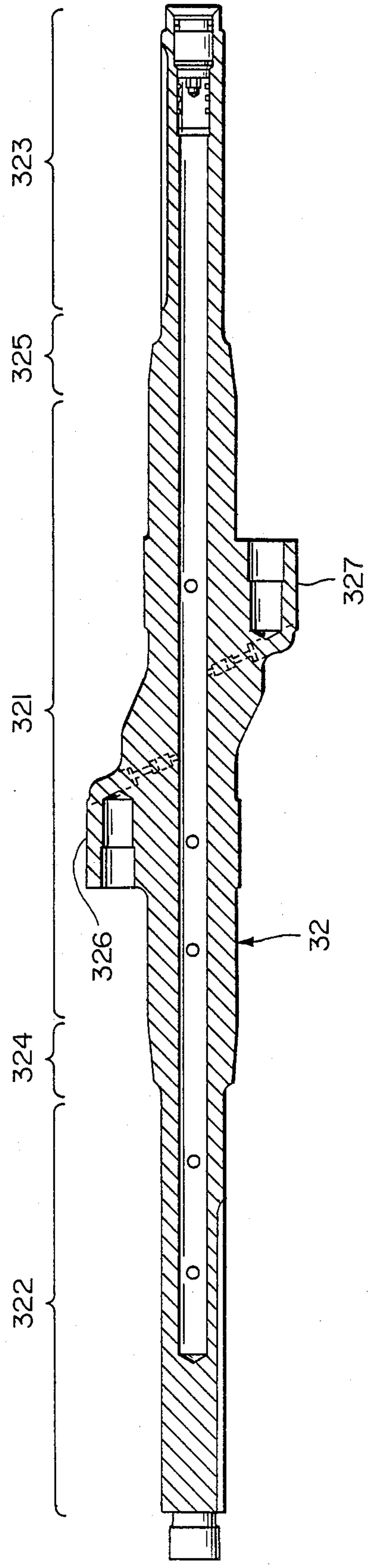
FIG. 3 is an axially sectional view showing a main eccentric shaft as installed in the engine of FIG. 1.
Figure 5:
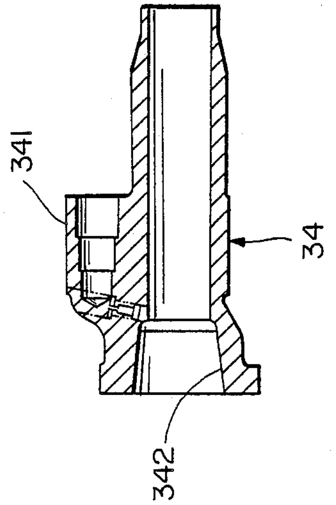
FIG. 5 is an axially sectional view showing a second auxiliary eccentric shaft as installed in the engine of FIG. 1.
Figure 4:
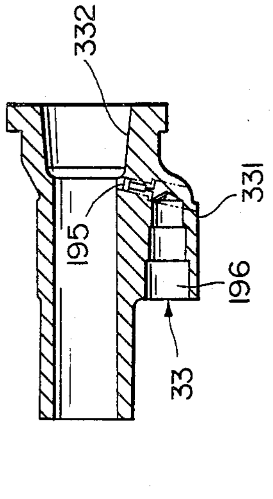
FIG. 4 is an axially sectional view showing a first auxiliary eccentric shaft as installed in the engine of FIG. 1.

In the engine 1, an eccentric shaft assembly 31 defining a rotational axis of each rotor is provided extended through the all cylinders. As shown in FIGS. 3, 4 and 5, this eccentric shaft assembly 31 consists of three elements, the main eccentric shaft 32 and first and the second auxiliary eccentric shafts 33, 34 coupled on opposite ends of the main eccentric shaft 32.

1.3.1 MAIN ECCENTRIC SHAFT

The main eccentric shaft 32 has an enlarged diameter portion 321 in the center region extending, at least, to cover the second and the third cylinders, and has first and second smaller diameter portions 322, 323, formed by reducing the ends in the regions where the first and the fourth cylinders, respectively, are mounted.

First tapered portion 324 is provided between the first smaller diameter portion 322 and the larger diameter portion 321, and second tapered portion 325 is provided between the second smaller diameter portion 323 and the larger diameter portion 321. The larger diameter portion 321 has an outer surface formed as second rotor eccentric journal portion 326 for rotatably supporting the second rotor 20 and third rotor eccentrical journal portion 327 for rotatably supporting the third rotor 21.

1.3.2 AUXILIARY ECCENTRIC SHAFTS

The first auxiliary eccentric shaft 33 is of cylindrical configuration, as shown in FIG. 4, and is coupled or fitted on the first smaller diameter portion 322. The second auxiliary eccentric shaft 34 is of cylindrical configuration, as shown in FIG. 5, and is coupled or fitted on the second smaller diameter portion 323. The first auxiliary eccentric shaft 33 has an outer surface formed as first rotor eccentric journal portion 331 for rotatably supporting the first rotor 19, and a tapered inner surface formed as third tapered portion 332 adapted to be fitted to the first tapered portion 324 on the main eccentric shaft 32, and also a cylindrical inner surface continuing from the tapered inner surface adapted to e fitted to the outer surface of the first smaller diameter portion 322.

Therefore, the first auxiliary eccentric shaft 33 is fitted to the main eccentric shaft 32 by inserting the first smaller diameter portion 322 of the main eccentric shaft 32 into the bore of the first auxiliary eccentric shaft 33 and pressing them together in the axial direction, whereby the first auxiliary eccentric shaft 33 is correctly positioned on the same axis as the main eccentric shaft 32, while the first rotor eccentric journal portion 331 is located to be accommodated in the first cylinder 2.

The second auxiliary eccentric shaft 3 is of substantially the same structure as the first auxiliary eccentric shaft 33, having an outer surface formed as the fourth rotor eccentric journal portion 341 for rotatably supporting the fourth rotor 22, and a tapered inner surface formed as the fourth tapered portion 342 adapted to be fitted to the second tapered portion 325 on the main eccentric shaft 32, and also a cylindrical inner surface continuing from the tapered inner surface and adapted to be fitted to the outer surface of the second smaller diameter portion 323.

1.3.3 THE COUPLING STRUCTURE OF THE ECCENTRIC SHAFT ASSEMBLY

Figure 7:
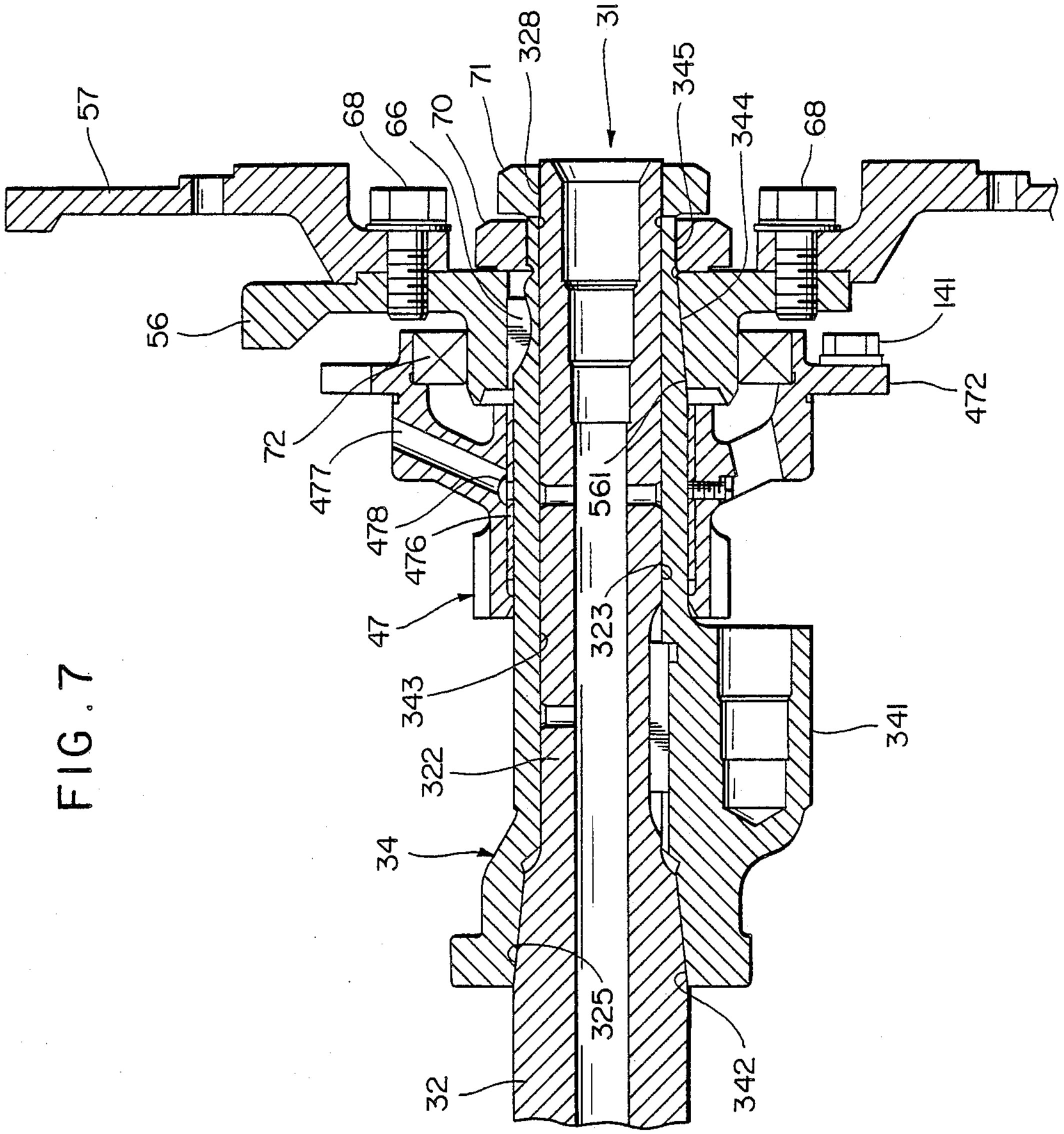
FIG. 7 is an enlarged axially sectional view showing a first embodiment of a coupling structure of the eccentric shaft assembly in accordance with the present invention.

More specifically, second auxiliary eccentric shaft 34 is constituted as shown in FIG. 7. Cylindrical inner surface 343 is adapted to be fitted to the outer surface of the second smaller diameter portion 323 and provides a loose-coupling (in the radial direction) structure, some play. In this embodiment and in a specific example thereof, the second smaller diameter portion 323 is designed to be 30.5 mm in its outer diameter, and is produced within a tolerance of 0 to $-12$ $\mu$m. On the other hand, the second auxiliary eccentric shaft 34 is designed to be 30.5 mm in its inner diameter at the surface 343, and is produced within a tolerance of $+25$ to 0 $\mu$m. Therefore, a clearance of average 20 $\mu$m(Min. 0 $\mu$m $\sim$Max 37 $\mu$m) is provided between the second smaller diameter portion 323 and the second auxiliary eccentric shaft 34. The second eccentric shaft 34 has a tapered axle portion 344 on the outer surface at its end.

Number 56 denotes a balancing weight having an inner surface formed as a tapered hole 561 adapted to be fitted to the tapered axle portion 344. Number 70 denotes a nut, which is screwed onto the threaded end of the second auxiliary eccentric shaft 34, for pressing the balancing weight 56 in the axial direction. The second auxiliary eccentric shaft 34 is fixed to the main eccentric shaft 32 by pressing the balancing weight 56 in the axial direction by means of the nut 70.

Number 71 denote nut, which is screwed onto the threaded end 328 of the main eccentric shaft 32. Number 72 denotes a seal. The fourth bearing unit 47 has a through-hole 477 communicating to the lubrication oil passage 27 at one end and to the hole 478 of the bearing 476 at the other end so that the lubrication oil can be introduced to the inside of the bearing 476.

1.3.4 SECOND EMBODIMENT OF THE COUPLING STRUCTURE OF THE ECCENTRIC SHAFT ASSEMBLY

Figure 8:
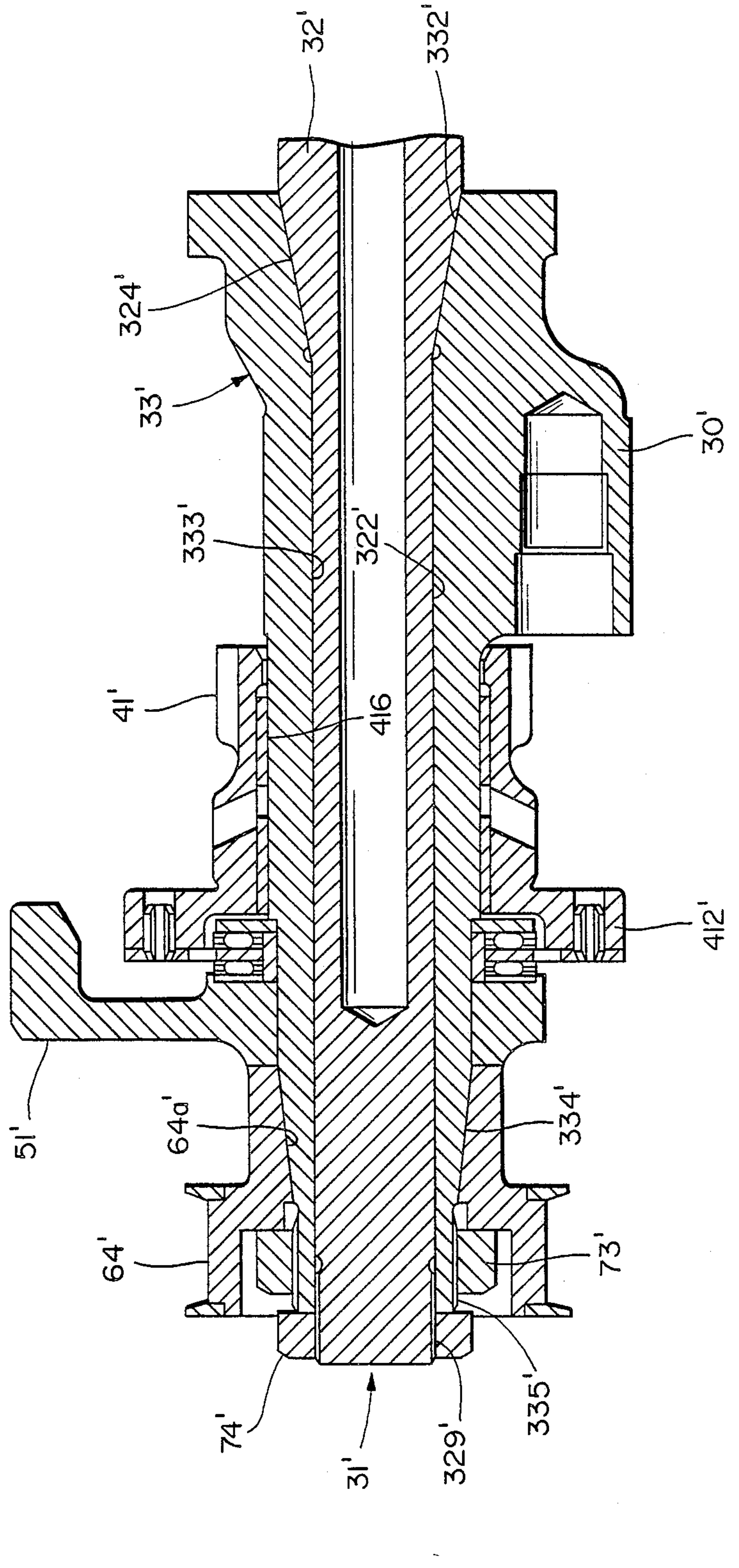
FIG. 8 is an enlarged axially sectional view showing a second embodiment of a coupling structure of the eccentric shaft assembly in accordance with the present invention.

FIG. 8 shows another example of the coupling structure, wherein the main eccentric shaft 32' and the first auxiliary eccentric shaft 33' can be sufficiently and tightly coupled by means of front pulley 64'. The first auxiliary eccentric shaft 33' has an inner tapered surface 332' adapted to be fitted to the tapered portion 324' of the main eccentric shaft 32' and has cylindrical inner surface 333' continuing from the inner tapered surface 332' and adapted to be fitted to the outer surface of the first smaller diameter portion 322' in a loose-coupling structure like that previously described. In a specific example, the loose-coupling structure has substantially the same specification and production tolerance as the above-mentioned first embodiment. The first auxiliary eccentric shaft 33' has a tapered axle portion 334' on the outer surface at its end.

The front pulley 64' has an inner surface formed as a tapered hole **64'*a* adapted to be fitted to the tapered axle portion 334'. Number 73' denotes a nut, which is screwed onto the threaded end 335' of the first auxiliary eccentric shaft 33', for pressing the front pulley 64'** in the axial direction.

Number 74' denotes a nut, which is screwed onto the threaded end 329' of the main eccentric shaft 33'.

1.4 BEARING STRUCTURE

Figure 6:
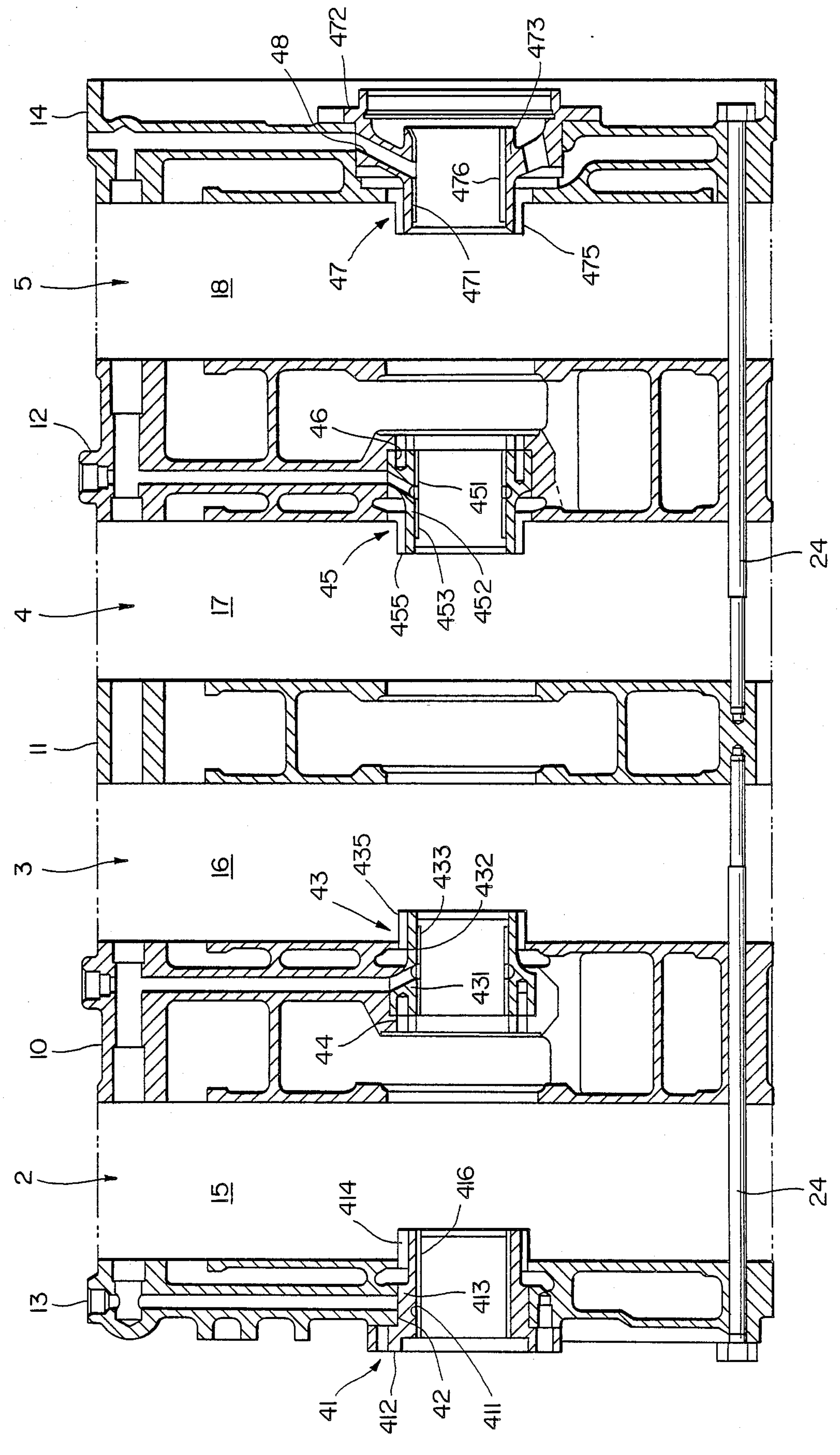
FIG. 6 is an axially sectional view showing side housings and intermediate housings defining the four rotor cylinder sections of FIG. 1.

Referring now to FIG. 6, the eccentric shaft assembly 31 is supported by four bearing units 41, 43, 46 and 47, which are mounted on the side housing 13, 14 and the intermediate housings 10, 12, respectively.

1.4.1 THE FIRST BEARING UNIT

The side housing 13, consisting of a part of the first cylinder 2, holds the first bearing unit 41. Unit 41 includes geared hub 411 inserted in through-hole 42 on the side housing 13 and having a flange 412 extending to the outside of the side housing 13. The central part of hub 411 is an insertion 413. The flange 412 is fixed on the side surface of the side housing 13 by means of bolts 131. Inside of insertion 413 is a bearing 416 for rotatably supporting the first auxiliary eccentric shaft 33. On the end of insertion 413 opposite flange 412 is mounted stationary external gear 414 so that the stationary external gear 414 can be meshed with the internal year 415 fixed on the side surface of the rotor 19 facing the side housing 13.

1.4.2 SECOND BEARING UNIT

The second bearing unit 43 is a geared hub 431 comprised of an insertion 432 inserted in through-hole 44 on intermediate housing 10, and fixed to the intermediate housing 10 at its base end by means of bolts 101. The insertion 432 has mounted inside of it a bearing 433 for rotatably supporting the larger diameter portion 321. The insertion 432 opposite its bolted end has stationary external year 435 mounted on its end so that the stationary external gear 435 can be meshed with internal gear 434 fixed on the side surface of the rotor 20 facing the intermediate housing 10.

1.4.3 THIRD BEARING UNIT

The third bearing unit 45 is of similar structure to the second bearing unit 43. Geared hub 451 has an insertion 452 inserted in through-hole 46 on the intermediate housing 11, and is fixed to the intermediate housing 11 at its base end by means of bolts 121. The insertion 452 has mounted inside of it a bearing 453 for rotatably supporting the larger diameter portion 321. The insertion 452 has a stationary external gear 455 mounted on its free end so that the stationary external gear 455 can be meshed with internal gear 454 fixed on the side surface of the rotor 21 facing to the intermediate housing 12.

1.4.4 FOURTH BEARING UNIT

The fourth bearing unit 47 is of similar structure to the first bearing unit 41. Geared hub 741 has a flange 742 extending outside the side housing 14 and includes an insertion 473 inserted in through-hole 48 on the side housing 14. The flange 472 is fixed on the side surface of the side housing 14 by means of bolts 141. The insertion 473 has mounted inside of it a bearing 476 for rotatably supporting the second auxiliary eccentric shaft 34. The insertion 473 has a stationary external gear 475 mounted on its free end so that the stationary external gear 475 can be meshed with internal gear 474 fixed on the side surface of the rotor 22 facing the side housing 14.

1.5 OTHER STRUCTURE

At one end of the eccentric shaft assembly 31 protruding from the side housing 13 to the left as shown in the FIG. 1, are provided balancing weight 41, driving gear 53 for driving first to third oil pumps 61, 62, and 63, and driving gear 80 of a distributor (not shown) all of which are connected with the eccentric shaft assembly 31 by key 49 and are fastened in the axial direction by means of nut 54 threaded onto the threaded end of shaft 32 The first auxiliary eccentric shaft 33 is pressed by the balancing weight 51 through thrust bearing 55 to couple firmly the first auxiliary eccentric shaft 33 to the main eccentric shaft 32.

On the other hand, the other end of the eccentric shaft assembly 31 protruding from the side housing 14 is similarly provided with balancing weight 56 and flywheel 57.

2. INSTALLATION PROCEDURE

The engine of the present invention is installed accordance with the following procedure.

<Step 1>

The intermediate housing 11 is inserted between the second rotor eccentric journal portion 325 and the third rotor eccentric journal portion 327.

<Step 2>

The second rotor 20 is engaged with the second rotor eccentric journal portion 326, and the third rotor 31 is engaged with the third rotor eccentric journal portion 327. The second and the third rotor housings 7 and 8 are positioned on opposite sides as of the intermediate housing 11 by means of the hollow pins 23.

<Step 3>

The intermediate housing 10 carrying the second bearing unit 43 is placed in position next to the second rotor eccentric journal portion 326 so that the stationary external gear 435 can be meshed with the internal year 434 fixed on the side surface of the rotor 20.

The intermediate housing 12 carrying the third bearing unit 45 is placed in position next to the third rotor eccentric journal portion 327 so that the stationary external gear 455 can be meshed with the internal gear 454 fixed on the side surface of the rotor 31.

<Step 4>

The first auxiliary eccentric shaft 33 is coupled with the first smaller diameter portion 322 through the key 36, and the second auxiliary eccentric shaft 34 is coupled with the second smaller diameter portion 323 through the key 37.

<Step 5>

The first rotor 19 is engaged with the first rotor eccentric journal portion 331 on the first auxiliary eccentric shaft 33, and the fourth rotor 22 is engaged with the fourth rotor eccentric journal portion 341 on the second auxiliary eccentric shaft 34. The first rotor housing 6 is positioned to the side of the intermediate housing 10 by means of the hollow pins 23, and the fourth rotor housing 9 is positioned to the side of the intermediate housing 12 by means of the hollow pins 23.

<Step 6>

The side housing 13 carrying the first bearing unit 41 is place in position next to the first rotor eccentric journal portion 331 so that the stationary external gear 414 can be meshed with the internal gear 415 fixed on the side surface of the rotor 19. The side housing 14 carrying the fourth bearing unit 47 is placed in portion next to the fourth rotor eccentric journal 341 so that the stationary external gear 475 can be meshed with the internal gear 474 fixed on the side surface of rotor 22.

<Step 7>

All the housings are firmly fixed by means of tightening bolts 24.

<Step 8>

The first auxiliary eccentric shaft 33 and the second auxiliary eccentric shaft 34 are firmly fixed by means of fasteners, such as, bolts.

3. MERITS OF THE PRESENT INVENTION COMPARED WITH THE PRIOR ART

3.1 ECCENTRIC SHAFT STRUCTURE

The eccentric shaft assembly 31 of the present invention has a higher rigidity compared with the eccentric shaft assembly divided in the axial direction a taught by the prior art, because the main eccentric shaft has enough length to pass through the entire engine and, therefore affords inherently sufficient rigidity. The eccentric shaft assembly 31 is easily installed by inserting the main eccentric shaft to the bore of the auxiliary eccentric shaft. This enables easy centering of shafts to be easy and the installation to be facilitated.

3.2 BEARING STRUCTURE

The location of the bearing units 41, 43, 45 and 47 in the present invention relative to the first and the second smaller diameter portions 322, 323 of the main eccentric shaft 32 enables superior and effective suppression of deformation of the main eccentric shaft, because these bearing units are located to support the small cross-sectional areas of the main eccentric shaft 32. Also, locating the two bearing units 41, 47 on the side housings 13,14 brings the following merit. The side housings 13, 14 have a larger flexibility and freedom to locate the bearing units than the intermediate housings 10, 11 and 12. The bearing units 41, 47 on the side housings 13, 14 can be designed to be big and thick enough to stiffly support the eccentric shaft assembly 31, which leads to suppression of deformation and vibration of the eccentric shaft assembly.

3.3 SUPPORTING STRUCTURE

The supporting structure of the present invention is characterized as follows. The stationary external gear meshed with the internal gear of the rotor is supported by the respective outer housing of the cylinder when seen in the axial direction of the eccentric shaft assembly. For example, though the first rotor 19 can be supported by either of the side housing 13 and the intermediate housing 10, the stationary external gear 414 is supported like a cantilever by the side housing 13 which is located to the outer side in the axial direction. Location the four bearing units according to above-mentioned layout is effective to lower vibration, especially at the far or remote end of the eccentric assembly which is more apt to swing.

3.4 LOOSE-COUPLING STRUCTURE

In accordance with the present invention, utilizing the loose-coupling structure enables the main eccentric shaft and the auxiliary eccentric shaft to be smoothly fitted at the tapered surfaces.

Although the invention has been described with respect to specific preferred embodiments, changes are possible without departing from the spirit and scope of the invention. Such changes as will be apparent to those skilled in the art from the teachings of the present invention are deemed to fall within the purview of the invention as claimed.

What is claimed is:

1. A four-rotor rotary piston engine, comprising:

an engine housing defining four rotor chambers therein;

first to fourth rotors disposed in said four rotor chambers, respectively; and eccentric shaft means for mounting thereon said first to fourth rotors in said rotor chambers and defining an axis of planetary rotation of said first to fourth rotors, said eccentric shaft means including:

a main eccentric shaft having a large diameter shaft portion formed at a middle portion, said large diameter shaft portion including second and third eccentric journals for rotatably supporting thereon said second and third rotors, respectively, small diameter shaft portions located on opposite sides of said large diameter shaft portion and a tapered shaft portion located between said large diameter shaft portion and each said small diameter shaft portion;

a first auxiliary eccentric shaft formed thereon with a first eccentric journal for rotatably supporting thereon said first rotor and an axially extending through hole formed at one end with a tapered end so as to couple said first auxiliary eccentric shaft to said main eccentric shaft with said tapered end firmly contacting said tapered shaft portion of said main eccentric shaft;

a second auxiliary eccentric shaft formed thereon with a fourth eccentric journal for rotatably supporting thereon said fourth rotor and an axially extending through hole formed at one end with a tapered end so as to couple said second auxiliary eccentric shaft to said main eccentric shaft with said tapered end firmly contacting said tapered shaft portion of said main eccentric shaft; and at least one of said first and second auxiliary eccentric shafts being formed with a cylindrical portion of the axially extending through hole having an internal diameter greater than an external diameter of a corresponding cylindrical portion of an associated small diameter shaft portion to form a gap therebetween so as to be loosely mounted to an associated small diameter shaft portion of said main eccentric shaft, thereby allowing said at least one of said first and second auxiliary eccentric shafts to smoothly fit on said main eccentric shaft.

2. A four-rotor rotary piston engine in accordance with claim 1, further comprising fixing means for fixing said at least one of said first and second auxiliary eccentric shafts on said main eccentric shaft so as to assemble said eccentric shaft means as an integral whole.

3. A four-rotor rotary piston engine in accordance with claim 2, wherein said at least one of said first and second auxiliary eccentric shafts has a tapered outer surface and said fixing means has a tapered bore fitting on said tapered outer surface of said at least one of said first and second auxiliary eccentric shafts.

4. A four-rotor rotary piston engine in accordance with claim 1, further comprising bearing means disposed in said housing for rotatably supporting said eccentric shaft means thereon.

5. A four-rotor rotary piston engine, comprising an engine housing defining first to fourth rotor chambers therein;

first to fourth rotors disposed in said four rotor chambers, respectively, each of said rotors being provided with internal gear means fixed to a side surface thereof;

eccentric shaft means for mounting thereon said first to fourth rotors in said rotor chambers and defining an axis of planetary rotation of said first to fourth rotors, said eccentric shaft means including:

a main eccentric shaft having a large diameter shaft portion formed at a middle portion, said large diameter shaft portion including second and third eccentric journals for rotatably supporting thereon said second and third rotors, respectively, small diameter shaft portions located on opposite sides of said large diameter shaft portion and a tapered shaft portion located between said large diameter shaft portion and each said small diameter shaft portion;

a first auxiliary eccentric shaft formed thereon with a first eccentric journal for rotatably supporting thereon said first rotor and an axially extending through hole formed at one end with a tapered end so as to couple said first auxiliary eccentric shaft to said main eccentric shaft with said tapered end firmly contacting said tapered shaft portion of said main eccentric shaft;

a second auxiliary eccentric shaft formed thereon with a fourth eccentric journal for rotatably supporting thereon said fourth rotor and an axially extending through hole formed at one end with a tapered end so as to couple said second auxiliary eccentric shaft to said main eccentric shaft with said tapered end firmly contacting said tapered shaft portion of said main eccentric shaft;

at least one of said first and second auxiliary eccentric shafts being formed with a cylindrical portion of the axially extending through hole having an internal diameter greater than an external diameter of a corresponding cylindrical portion of an associated small diameter shaft portion to form a gap therebetween so as to be loosely mounted to an associated small diameter shaft portion of said main eccentric shaft, thereby allowing said at least one of said first and second auxiliary eccentric shafts to smoothly fit on said main eccentric shaft; and bearing means attached to a side wall of each of said first to fourth chambers and having an external gear in mesh with said internal gear means for mounting thereon each of said first to fourth rotor.

6. A four-rotor rotary piston engine in accordance with claim 5, wherein said side surface of each of said first to fourth rotors to which said internal gear is fixed is on a side of each of said first to fourth rotors remote from an axial center of said engine housing with respect to each of said first to fourth rotors.

7. A four-rotor rotary piston engine in accordance with claim 5, wherein said side wall of each of said first to fourth rotor chambers to which said bearing means is attached is on a side of each of said first to fourth rotor chambers remote from an axial center of said engine housing with respect to each of said first to fourth rotors.

8. A method of assembling a four-rotor rotary piston engine comprising an engine body defining first to fourth rotor chambers by an intermediate rotor housing and two end rotor housings fixed to opposite ends of said intermediate rotor housing, respectively, and eccentric shaft means for mounting thereon first to fourth rotors in said rotor chambers, respectively, and defining an axis of planetary rotation of said first to fourth rotors, said eccentric shaft means including a main eccentric shaft having a large diameter shaft portion formed at a middle portion, said large diameter shaft portion being formed thereon with second and third eccentric journals for rotatably supporting thereon said second and third rotors, respectively, small diameter shaft portions located on opposite sides of said large diameter shaft portion and a tapered shaft portion located between said large diameter shaft portion and each said small diameter shaft portion, first and second auxiliary eccentric shaft each formed thereon with an eccentric journal for rotatably supporting thereon each of said first and fourth rotors and an axially extending through hole having at one end a tapered end so as to couple each of said first and second auxiliary eccentric shafts to said main eccentric shaft with said tapered end firmly contracting said tapered shaft portion of said main eccentric shaft, said method comprising the steps of:

fitting said main eccentric shaft into said intermediate rotor housing;

rotatably mounting said second and third rotor on said second and third eccentric journals of said main eccentric shaft;

loosely coupling each said first and fourth auxiliary eccentric shafts onto an associated smaller diameter shaft portion of said main eccentric shaft with a gap between at least one of said first and fourth auxiliary eccentric shafts and an associated smaller diameter shaft portion;

attaching said two end rotor housings onto said main eccentric shaft; and tightening each said auxiliary eccentric shaft by fastening means so as to firmly fix each said auxiliary eccentric shaft to said main eccentric shaft.

* * * * *